United States Patent [19]

Hupp

[11] Patent Number: 4,853,777
[45] Date of Patent: Aug. 1, 1989

[54] METHOD FOR EVALUATING SMOOTH SURFACES

[75] Inventor: Stephen S. Hupp, Dublin, Ohio
[73] Assignee: Ashland Oil, Inc., Russell, Ky.
[21] Appl. No.: 150,136
[22] Filed: Jan. 29, 1988

Related U.S. Application Data

[63] Continuation-in-part of Ser. No. 74,886, Jul. 7, 1987, abandoned.

[51] Int. Cl.$^4$ .......................... H04N 7/18; G01B 11/24
[52] U.S. Cl. ..................................... 358/107; 356/376; 73/105
[58] Field of Search ................... 358/107; 73/104, 105; 356/237, 376, 372; 428/355

[56] References Cited

U.S. PATENT DOCUMENTS

| | | |
|---|---|---|
| 4,249,823 | 2/1981 | Task . |
| 4,468,426 | 8/1984 | Hatchadoorian et al. .......... 428/355 |
| 4,476,489 | 10/1984 | Weltlich et al. ................... 358/107 |
| 4,629,319 | 12/1986 | Clarke et al. ....................... 356/237 |
| 4,634,281 | 1/1987 | Eikmeyer . |
| 4,647,197 | 3/1987 | Kitaya et al. . |

FOREIGN PATENT DOCUMENTS

0200141 10/1985 Japan .................................. 356/376

OTHER PUBLICATIONS

Faust, "Real Time Measurement of Veneer Surface Roughness by Image Analysis", From Forest Products Journal, vol. 37, No. 6 (Jun. 1987) pp. 34–40.
Colton, "The Optical Characterization of the Surface of Polymeric Composites", from Laboratory for Manufacturing and Productivity School of Engineering (Feb. 1981), pp. 1–74.

*Primary Examiner*—Stewart J. Levy
*Assistant Examiner*—Robert R. Raevis
*Attorney, Agent, or Firm*—Wood, Herron & Evans

[57] ABSTRACT

The short-term and long-term waviness of a smooth surface is determined quantitatively by a method which impinges light radiation onto the surface, detects the resultant light image, and mathematically processes that image. The method permits a fast, non-contact evaluation of a smooth surface with good correlation between the calculated values and the visual observation.

10 Claims, 4 Drawing Sheets

FIG. 6f

METHOD FOR EVALUATING SMOOTH SURFACES

RELATED APPLICATION

This is a continuation-in-part of application Ser. No. 74,886, filed July 7, 1987, now abandoned, invented by Stephen S. Hupp, and assigned to the assignee of this application.

BACKGROUND OF THE INVENTION

A variety of manufactured goods are available on the market which utilize smooth sheet-like surfaces to enhance the appearance of the product. Representative examples of such goods include sheets for use on trucks and automobiles as body parts, large and small appliances such as washers, dryers, ovens, refrigerators, automatic coffee-makers, and toasters; wall coverings such as wood paneling and laminated sheets; glass or clear plastic plates for use as windows, mirrors, room dividers and the like.

In the past, evaluation of the surfaces of smooth sheets was done by visual observation. In actuality, the human eye is well-designed for use in evaluating surface quality, at least for those surfaces used to enhance product appearance. The reason is that ultimately it is the human eye which will scrutinize the product containing the smooth surfaces in determining whether to purchase that product.

The eye is a good qualitative judge of the acceptability of a particular smooth surface, but reproducible quantitative evaluations of acceptability cannot be rendered. Further, though the eye can distinguish good surfaces from bad, it cannot accurately evaluate surfaces which lie in the range between good and bad.

To address the problem of effectively analyzing smooth surfaces in a quantitative manner, several companies have devised quantitative surface analysis equipment. A representative of Daimler-Benz AG presented a paper to the Society of Automotive Engineers in late February-early March of 1983, entitled "Method for Determining the 'Long Term Waviness' of Large SMC Panels". The article discloses the use of a digital length gauge which contacts the surface to be evaluated. Data points corresponding to a vertical deflection of the gauge tip as it passes over the surface to be evaluated are collected and stored. The stored data are then processed to determine an average deflection height, or amplitude, of the line on the surface tracked by the length gauge. The average amplitude along the single line provides a quantitative value which is said to correspond to surface quality. A lower average amplitude corresponds to a better surface.

A second method of quantitative analysis has been developed by ICI Americas, Inc. and is presented in a paper by A. T. Hurst entitled "Measurement Aspects And Improvement Of Surface Profile In Thin Gauge Molded Sheet Molding Compounds", Polym.-Plast. Technol. Eng. 20(1), 65–77 (1983).

The method utilizes a surface wavemeter apparatus which consists of a linear voltage displacement transducer attached to a gauge traversing mechanism which permits the transducer to be drawn over the surface to be evaluated. Both the horizontal and vertical position of the transducer can be determined. The vertical displacement is exaggerated to more clearly show variations on the evaluated surface. The voltage output from the transducer is converted into a digital display and transmitted to a microprocessor.

The transducer evaluates one line on the surface with each complete scan. Generally, two scans are conducted over the object, the lines being at 60° angles to each other in the center of the tested surface. Analysis is performed only in the direction of the visual evaluation.

The digitized voltage output from the scans easily converts to a graphical output which is then analyzed for wavelength, amplitude, wave area, and slope of the ascending line. The analysis requires the presence of at least two troughs which define the endpoints of a wave. Otherwise, calculations and conclusions based on the data are not meaningful. In addition to the need for scanning along the same lines of sight as a human evaluator, it is also important that the scans begin nearest the observer and travel away so that the slope measurement subsequently determined is meaningful in correlating the mathematical values with human rankings.

A third quantitative surface analysis method has been developed by The Budd Company and is described in an article by K. A. Iseler and R. E. Wilkinson, entitled "A Surface Evaluation System For Class A Applications", Society of the Plastics Industry, Inc., 39th Annual Conference, Jan. 16–19, 1984. The Budd Analyzer was essentially the same apparatus as that employed at Daimler-Benz AG, but evaluates the collected data points based on different mathematical concepts. The theory is that the evaluation should not be based on surface waviness, but rather on random surface ripples along a grid line.

Weltlich U.S. Pat. No. 4,476,489 discloses a non-contact surface analysis system which measures the microfinish of a workpiece and compares that finish with known finishes. Weltlich transports the workpiece into a position which permits illumination of the piece, illuminates the surface of the workpiece, views the illuminated surface via a camera, digitizes the signal generated by the camera on a pixel-by-pixel basis, stores the digitized signal, classifies the pixels by varying intensity, and compares the distribution curve of pixel intensity with other curves from preselected finishes. Weltlich generates data points which are utilized only to evaluate the overall reflectance of the analyzed piece and to compare that piece's overall reflectance with those of preselected finishes. The evaluation technique as practiced in Weltlich is also known as the determination of the short-term waviness of the finish. The short-term waviness of a surface correlates to the presence of peaks and troughs of less than about one centimeter on the analyzed surface. Weltlich does not address the analysis of the long-term waviness of a surface.

Other known methods of evaluating surface quality are based primarily on visual inspection, and are qualitative determinations. The visual evaluation of a surface with subsequent ranking has been discussed earlier, and is essentially incapable of being quantified except by statistical analysis of a large number of individual rankings. A variant of the above-mentioned visual-based evaluation method employs a symmetric grid shown onto a dark, polished surface, with subsequent evaluation of the grid lines as they reflect back from the surface. The reflection may be photographed for comparative study. Again, however, this method is qualitative.

BRIEF DESCRIPTION OF THE INVENTION

It is an object of the present invention to quantitatively analyze smooth surfaces via a method which more closely approximates the process employed by a human evaluator when making a visual inspection.

It is a further object to quantitatively analyze smooth surfaces by a method which is faster, more comprehensive, and more easily adapted to rapid evaluations of large numbers of smooth surfaces.

It is still a further object to analyze smooth surfaces by a method which does not require physical contact with the surface to be evaluated.

It is yet a further object to quantitatively determine both short-term and long-term waviness of a surface to be evaluated using a non-contact analysis method.

Briefly, smooth surfaces are evaluated by impinging light radiation onto an object, the radiation being in the form of a straight line transverse to the direction of propagation of the incident beam. The straight line reflects from the surface of an object or deflects through an object and is detected. The detected image is then transformed, into a digitized signal from which data points are generated for subsequent mathematical processing.

The light source may be any kind which results in reflection from a surface or deflection through an object to be evaluated. Typically, the light generated by an incandescent or fluorescent bulb may be used, but a preferred light generator is the laser. By the use of appropriate optical devices, the sharp point of light emitted from the laser can be widened to form a light slit which impinges a wide section of the evaluated surface, the slit being transverse to the direction of propagation of the incident beam. The slit may be only a single laser point in height, but may be from several inches to several feet in width. Visible and invisible light sources may be used.

The light slit is a straight line at the point of generation. Upon shining onto the surface of the object, the light slit is reflected from the surface or deflected through the object to create an image which is modified from that of a straight line based on the contour of the surface or on the distortion in the object. This image is detected and then quantified. The quantification process can be relatively simple, as where the image is photographed and then laid onto a grid for conversion to a series of X-Y coordinates, which serves as a basis for further mathematical processing. A more elegant process detects the image by means of a video camera. The signal proceeds to an image capture board which digitizes the image and thereby permits storage in a computer for subsequent mathematical processing.

A number of parallel, evenly-spaced light slits are trained over an entire area of the surface to be evaluated. It has been found empirically that analysis of an area approximately 10″ by 10″ is sufficient to effectively determine the quality of a smooth surface having larger dimensions. After quantification of the image, the coordinate points corresponding to the image are processed via mathematic equations to produce a value which correlates closely with visual evaluations and which therefore is indicative of the quality of the surface.

The advantages of this invention will become more readily apparent from the following detailed description of the invention and the drawings in which:

DETAILED DESCRIPTION OF THE INVENTION

Smooth surfaces 2 are evaluated for quality using light radiation to create images which are transformed into numerical equivalents capable of being displayed on a coordinate system of at least two dimensions. The numerical equivalents are then processed mathematically to obtain a value indicative of the quality of the smooth surface 2.

Figure 1:
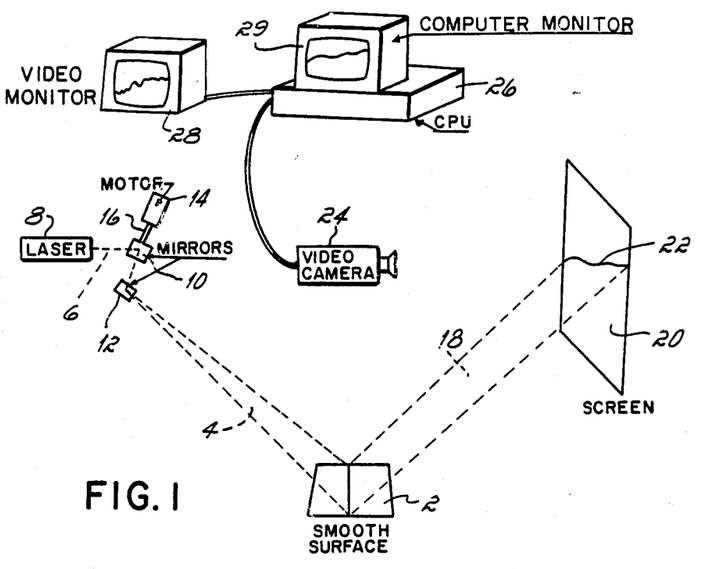
FIG. 1 is a diagram of the evaluation apparatus utilizing laser generated light radiation.

In FIG. 1, smooth surface 2 is evaluated preferably by impinging an incident beam of laser light 4 onto a portion of the surface 2. The incident beam 4 is impinged onto the surface 2 at an angle, preferably in the range of 60° to 5° relative to the plane of the surface 2. However, it is possible for the angle of incidence to fall outside the preferred range depending on the relative positions of the components of the evaluation system and the reflective characteristics of the evaluated surface. Though less preferred, a beam of non-coherent light of sufficient intensity may also be employed. The incident beam 4 is produced by reflecting the coherent source 6 from laser 8 first onto oscillating mirror 10 and then onto mirror 12. The incident beam 4 length is dependent upon the extent of oscillation of mirror 10. Oscillation of the mirror 10 is produced by motor 14 which is connected to oscillating mirror 10 by motor shaft 16. The incident beam 4 preferably has a length transverse to the direction of propagation of the incident beam 4 of 2 to 20 inches, and has a height of approximately 0.05–0.25 inches. The laser preferably generates a continuous beam, and is a low-power type such as a 4 mW Helium-Neon laser.

The light which reflects away from the smooth surface 2 in FIG. 1 constitutes the resultant beam 18. The smooth surface includes those surfaces which are curved or bent. The term "smooth" is merely intended to define a characteristic of the surface which will lend itself to analysis using the described apparatus. Alternatively, where an object is transparent or semi-transparent, the resultant beam may be deflected through the object (not shown).

The resultant beam 18 impinges screen 20 to produce an image 22 which corresponds to the modification imparted to the incident beam 4 by the smooth surface 2. As the invention is presently practiced on reflective surfaces, the screen 20 and laser 8 are located on a direct line above the smooth surface 2 and are approximately 10 feet apart. The smooth surface 2 is located midway between the laser 8 and screen 20 and situated such that the incident beam 4 strikes smooth surface 2 at an optimum angle in the range of about 30° to about 35° relative to the plane of the smooth surface. The image 22 is preferably detected by video camera 24 which is connected to central processing unit 26 connected to both a video monitor 28, which is capable of monitoring the video camera 24 or a digitized image produced by an image capture board in the central processing unit 26, and a computer monitor 29 which generates a visual output of the information stored in the central processing unit 26.

Other means may be employed in obtaining an image correlating to the modification of a straight line incident beam by a smooth surface. For example, a narrow height beam of noncoherent light, such as that generated by an incandescent or fluorescent lamp radiating through a slit, may be employed. However, the smooth surface must be relatively reflective to produce a discernible image. Further, the image may be detected via some means other than that of a video camera, such as by free-hand line tracing or by film camera. The system utilizing a laser and video camera/CPU elements is preferred, however, because of the speed and efficiency of analysis.

The system as heretofore described has referred to an image 22 as being reflected from the smooth surface 2. Light generated by the laser 8 has sufficient intensity to reflect from smooth surfaces having a range of reflectances. This ability to evaluate a wider variety of smooth surfaces provides additional basis for preferring laser-generated light.

It should be further noted that the invention is not intended to be limited strictly to the detection of images generated by reflection from a smooth surface. Objects such as glass panes for use in window frames or for display purposes, laminated glass/sheets for use in automobile windshields, and transparent and semi-transparent plastic sheets, among others, often need to be evaluated for the presence of optical distortion when viewing through the transparent or semi-transparent medium. The evaluation system described can be utilized in detecting a deflected image of an incident beam to determine the presence and extent of optical distortion in the object. The incident beam is projected through the object at an angle, preferably in the range of about 90° to about 30° relative to the surface of the object.

Figure 2:
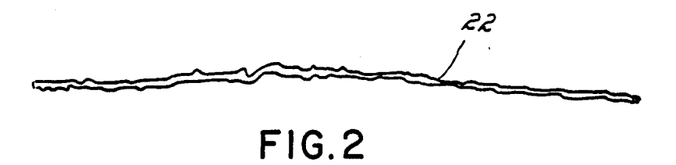
FIG. 2 is a depiction of a representative image generated by impinging light radiation onto the smooth surface of an object.
Figure 3:
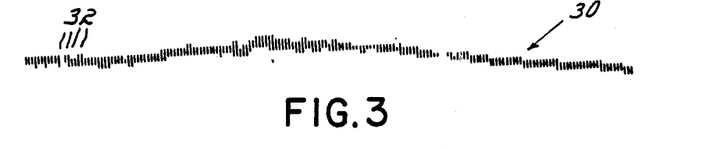
FIG. 3 is a depiction of the image of FIG. 2 after digitization by a computer.

After the image 22 has been generated, it is detected preferably by video camera 24 or by other means. A depiction of a representative image generated by impinging light radiation onto the smooth surface of an object is shown in FIG. 2. In the preferred embodiment, the video camera 24 is connected to a central processing unit 26 capable of digitizing images, such as an IBM AT Computer or an AT&T PC 6310 microcomputer containing an AT&T Image Capture Board. The image 22 can then be transformed to a digitized image 30 as depicted in FIG. 3. The central processing unit 26 receives the electrical output from the video camera 24 corresponding to the image 22. The image 22 contains a range of intensities of light, dependent on the instantaneous angles of reflection of the smooth surface 2 along the beam width illuminated by incident beam 4. The angles of reflection ideally are equal, which would result in a reflected image corresponding exactly with the incident beam 4.

After the central processing unit 26 receives the signal output from the video camera 24, the central processing unit 26 modifies the camera output by imposing a threshold requirement. Portions of the signal corresponding to low intensity scattered light which equate to a signal voltage lower than the threshold value are ignored by the central processing unit 26. The threshold limitation is set to ensure that the digitized image 30 has an appearance similar to that of the image 22.

As can be seen in FIG. 3, digitized image 30 is comprised of a number of vertical lines 32 having varying lengths. Arbitrarily, the unit of length for each line is the pixel, each line being one or more pixels in length. The pixel is a picture element on a video screen corresponding to an individual point source of light. The AT&T Image Capture Board employed in demonstrating the invention digitizes a 200×256 matrix of pixels. The unit of length can be alternatively set at centimeters, inches, etc. The distance between adjacent vertical lines 32 is one pixel.

The central processing unit 26 analyzes the individual height of each vertical line 32 of the digitized image 30 and determines both a mean height for all the vertical lines 32 and the standard, or root mean square, deviation of the individual heights of all the vertical lines 32 along the digitized image 30. The determination of mean vertical line height and standard deviation on the digitized image 30 does not take into account the specific contour or slope of the image 30. It is possible, however, that for other types of analysis, the contour or slope can be used directly in conjunction with the mean line height and standard deviation calculations.

The mean heights and standard deviation values for all of the digitized images generated in the evaluation of the smooth surface 2 are averaged to generate a number which serves as a measure of the appearance of the smooth surface 2. This average mean image height value correlates to the presence of peaks and troughs shorter than one centimeter on the surface of the smooth surface 2. These peaks and troughs are also denoted as the short-term waviness of the surface. The presence of such short wavelength peaks and troughs results in a surface which looks similar to an orange peel. A lower average mean image height value indicates that the smooth surface 2 has fewer short wavelength peaks and troughs.

A second type of evaluation that is performed on smooth surfaces 2 involves the determination of longer-wavelength peaks and troughs of from about one to ten centimeters or greater. These longer-wavelength peaks and troughs are evidenced visually by a wavy appearance in the smooth surface. The wavy appearance is known as "long-term waviness" and is particularly objectionable to a prospective buyer when found on the body panels of automobiles.

Figure 4:
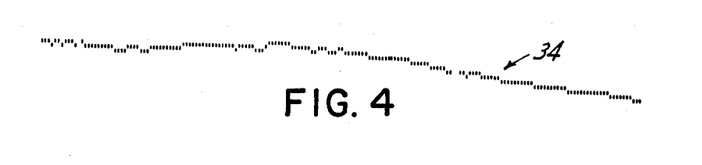
FIG. 4 is a depiction of a reduced line corresponding to the digitized line of FIG. 3.

The digitized image 30 as described above is used also in quantifying the long-term waviness of the smooth surface 2. The individual vertical lines 32 comprising the digitized image 30 have a definite length, either as calculated in pixels, inches, centimeters, or other unit. Each vertical line 32 has a midpoint, or a mean. The central processing unit 26 determines the midpoint of each vertical line 32 along the digitized image 30. A plot of each midpoint of each vertical line 32 produces a reduced line 34, which, as shown in FIG. 4, corresponds to the digitized image in FIG. 3.

To evaluate smooth surface 2 for long-term waviness, the reduced lines resulting from a number of images 22 must be generated. The images 22 are obtained by impinging the incident beam 4 onto smooth surface 2 along a number of parallel, equally-spaced intervals. Empirically the parallel interval was set at 0.5 inch, thus resulting in the generation of twenty-one images 22 in a 10 inch by 10 inch sampling area.

Figure 5:
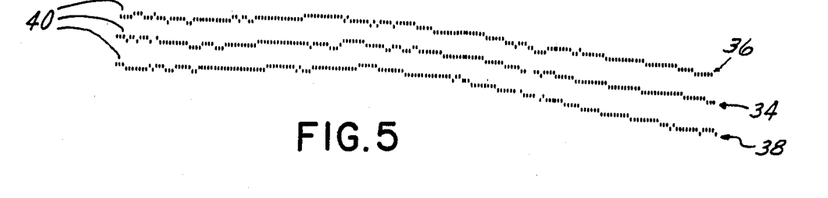
FIG. 5 is a depiction of three adjacent reduced lines.

One method of evaluating the long-term waviness is evaluated by comparing adjacent reduced lines 34. As shown in FIG. 5, reduced line 34 from FIG. 4 is flanked by adjacent reduced lines 36 and 38 generated in like manner. The distance between corresponding reduced line points 40 on reduced lines 36 and 34 is determined for each set of corresponding points. When all the distances between adjacent reduced lines 36 and 34 have been measured, then the mean distance and the standard deviation of the distance are calculated. The procedure is repeated for adjacent reduced lines 34 and 38, and so on, until all adjacent reduced line distances, mean distances, and standard deviations have been calculated. Then, the average standard deviation for all sets of adjacent reduced lines is calculated. This average deviation is a measure of the parallelism of the smooth surface 2.

It can be seen, however, that adjacent lines may be parallel to each other but still be nonlinear when compared to an idealized line. For example, the adjacent reduced lines may be superimposable wavy curves. The average standard deviation value may be very low, but yet the smooth surface 2 may still be visually perceived as being flawed.

Another method of evaluation is available which does not have this potential problem and is thus preferred. The reduced lines 34 are individually fit mathematically to a polynomial which determines an idealized line fit for the specific reduced line 34. For flat, smooth surfaces, a second order polynomial of the form $$y = a + bx + cx^2$$

produces a sufficiently close line fit. For more highly-curved sufaces, third order and higher polynomials are needed. The higher order polynomials, which correspond to the form of the second order polynomial listed above, are used in evaluating the surface of a curved automobile fender, the rounded edge of a home appliance, or the like.

The polynomial generates an ideal line corresponding to the actual reduced line, of which line 34 is but one example. The ideal line is superimposed on the reduced line 34 and the standard deviation of the measured line from the ideal line is determined by comparing a plurality of corresponding points on each line. Again, an average standard deviation for all reduced lines is determined. The standard deviation is averaged for all 21 lines to give a single value which relates to long term waviness. A lower value indicates less long-term waviness and consequently a more attractive smooth surface.

The resulting values indicating either short-term or long-term waviness can be intercompared between analyzed surfaces because of the generation of a calibration factor for each evaluation. The calibration factor for an evaluation is determined by projecting from the laser 8 a calibration reference line of light having a known length (about 42.5 cm) directly onto the screen 20 which is approximately 10 feet from laser 8. This line is viewed by the video camera 24, digitized and then stored in the central processor unit 26. Typically, the calibration reference line will encompass about 200 pixels from end to end when displayed on the video monitor 28.

To calibrate the instrument, the laser incident beam 4 is first trained onto the surface to be analyzed located approximately midway between laser 8 and screen 20 and the first and twenty-first images 22 in the 10 inch by 10 inch sampling area are reflected individually onto the screen 20, viewed by video camera 24, and displayed as live images on video monitor 28. The images may be longer or higher, or both, than the field of view of the video camera. The increased size is due to curvature in the analyzed surface 2. To ensure that the reflected image 22 do not exceed the display capability of the video monitor 28, the lens of the video camera 24 is adjusted so that the reflected images 22 are entirely within and nearly fill the video monitor 28. After this adjustment has been completed, the calibration reference line is projected directly onto the screen 20, viewed by the adjusted video camera 24, digitized, stored in the central processor unit 26 and displayed on video monitor 28. The length of the digitized calibration reference line as displayed on video monitor 28 after adjustment of the video camera is calculated from the digitized image of that reference line. Two hundred (the number of pixels encompassed by a "typical" digitized calibration reference line) divided by the number of pixels encompassed by the digitized calibration reference line after camera adjustment constitutes the calibration factor.

The sensitivity of the surface analyzer in measuring long-term waviness is dependent on the angle of the incident beam as it strikes the surface in relation to the plane of the surface 2. The angle typically falls in the range of 5° to 60°. To obtain maximum sensitivity for a variety of surface textures and component placements, however, it has been found that the optimum angle of the incident bean varies with the specific texture and placement chosen, and thus must be determined by case basis. Using the above-described system for evaluation of a relatively flat, shiny surface, the optimum incident angle is approximately 30° to 35° in relation to the plane of the surface 2.

OPERATING EXAMPLES

The following detailed operating examples illustrate the practice of the invention it its most preferred form, thereby enabling a person of ordinary skill in the art to practice the invention. The principles of this invention, its operating parameters and other obvious modifications thereof will be understood in view of the following detailed procedures.

OPERATING EXAMPLE I

Figure 6A:
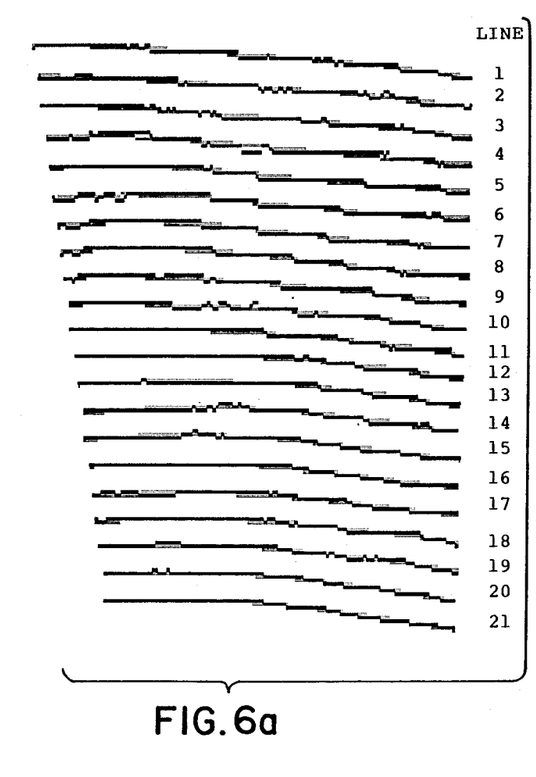
FIGS. 6a through 6f are representations of actual reduced and ideal lines generated for various surfaces.

After calibration of the surface has been completed, a beam of light from a 4 mW He—Ne laser is projected onto a General Scanning Model LK3002 mirror assembly which spreads the point-source beam into a line of laser light and directs the line at an angle in the range of 33° to 35° onto an untreated van hood compression molded from sheet molding compound (SMC). A section of the hood approximately 10"×10" is selected and 21 parallel lines spaced about 0.5 inch apart are sequentially projected onto the selected area, reflected onto a white screen, viewed by a Panasonic Model WV-1550 video camera, converted from an analog signal to a digitized equivalent by an AT&T Image Capture Board, stored in digital format in an AT&T PC 6310 minicomputer, and then displayed on a Sony video monitor. FIG. 6a provides a representation of the 21 reduced lines displayed as solid lines, and the polynomial line fit ideal lines as superimposed interrupted lines. In Table 1, below, column two contains the average line height in pixels of each reflected, digitized line corrected for calibration. The closer the overall average line height value approximates a minimum line height without being narrower than that minimum height, the fewer short-term waviness deformations are present. As a reference, the effective minimum line height after calibration adjustment using a 4 mW laser having a 0.49 mm laser beam diameter (measured at $1/e^2$) is approximately 1.90 pixels for a highly polished chrome-plated flat surface. Column three contains the root mean square (RMS) standard deviation values for each reflected, digitized line based on a comparison of each reduced line with its corresponding fitted ideal line. Multiplication of the average standard deviation with the calibration factor provides a corrected RMS deviation result which, for relatively flat surfaces, should fall in the range of 0.00 to 2.00. The corrected RMS deviation result is directly proportional to the presence of long-term waviness defects. A lower corrected RMS deviation result indicates fewer long-term waviness defects.

TABLE 1

| Line | Corrected Average Line Height (pixels) ("Short-Term") | Root Mean Square Deviation ("Long-Term") |
|---|---|---|
| 1 | 3.4551 | 0.3948 |
| 2 | 3.2647 | 0.4873 |
| 3 | 2.8740 | 0.5181 |
| 4 | 3.7357 | 0.6740 |
| 5 | 3.7993 | 0.5983 |
| 6 | 3.5540 | 0.4689 |
| 7 | 3.7081 | 0.3338 |
| 8 | 3.9451 | 0.3549 |
| 9 | 3.9610 | 0.3980 |
| 10 | 3.6515 | 0.3940 |
| 11 | 3.9787 | 0.3512 |
| 12 | 4.7030 | 0.3929 |
| 13 | 4.4495 | 0.2795 |
| 14 | 4.1481 | 0.3691 |
| 15 | 4.8028 | 0.3371 |
| 16 | 5.2947 | 0.4762 |
| 17 | 4.8349 | 0.4319 |
| 18 | 4.6798 | 0.2800 |
| 19 | 5.0464 | 0.3813 |
| 20 | 5.3536 | 0.3001 |
| 21 | 5.5530 | 0.3381 |
| Overall Average: | 4.2283 | 0.4076 |

Calibration Factor: 1.8868
Corrected RMS Deviation Result: 0.4076 × 1.8868 = 0.7690

OPERATING EXAMPLE II

Figure 6B:
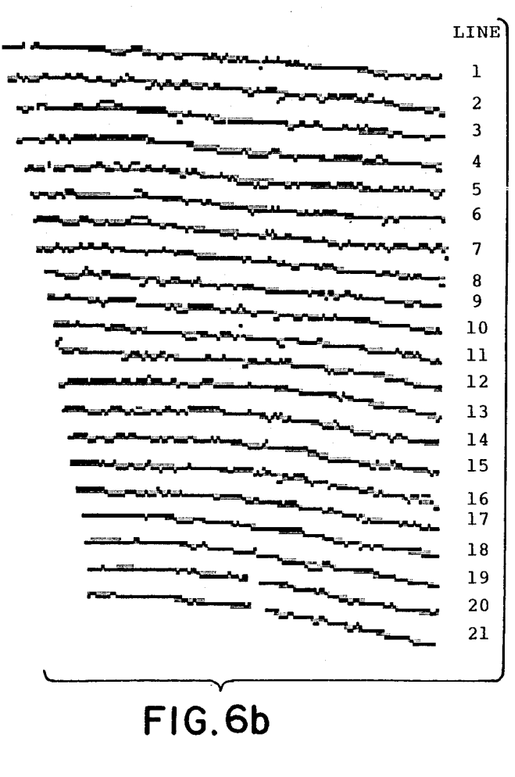

The van hood from operating Example I is painted with primer and then subjected to the same analysis procedure as described in Example I. Table 2 below sets out the pertinent derived numerical values. The representation of reduced and ideal lines for the primed hood is provided in FIG. 6b.

TABLE 2

| Line | Corrected Average Line Height (pixels) ("Short-Term") | Root Mean Square Deviation ("Long-Term") |
|---|---|---|
| 1 | 5.5362 | 0.6317 |
| 2 | 5.6111 | 0.7713 |
| 3 | 5.4947 | 0.7761 |
| 4 | 6.2302 | 0.7709 |
| 5 | 5.7125 | 0.8610 |
| 6 | 6.0117 | 0.6450 |
| 7 | 6.0898 | 0.6761 |
| 8 | 5.7132 | 0.5664 |
| 9 | 6.6513 | 0.6441 |
| 10 | 6.3030 | 0.6455 |
| 11 | 7.7830 | 0.6267 |
| 12 | 7.3934 | 0.5892 |

TABLE 2-continued

| Line | Corrected Average Line Height (pixels) ("Short-Term") | Root Mean Square Deviation ("Long-Term") |
|---|---|---|
| 13 | 7.9415 | 0.5058 |
| 14 | 7.7330 | 0.7118 |
| 15 | 7.8519 | 0.7651 |
| 16 | 7.9568 | 0.7854 |
| 17 | 6.9827 | 0.5683 |
| 18 | 7.6830 | 0.4721 |
| 19 | 7.3951 | 0.5603 |
| 20 | 7.7374 | 0.3953 |
| 21 | 7.5795 | 0.3997 |
| Overall Average: | 6.8281 | 0.6366 |

Calibration Factor: 1.8868
Corrected RMS Deviation Result: 0.6366 × 1.8868 = 1.2011

OPERATING EXAMPLE III

Figure 6C:
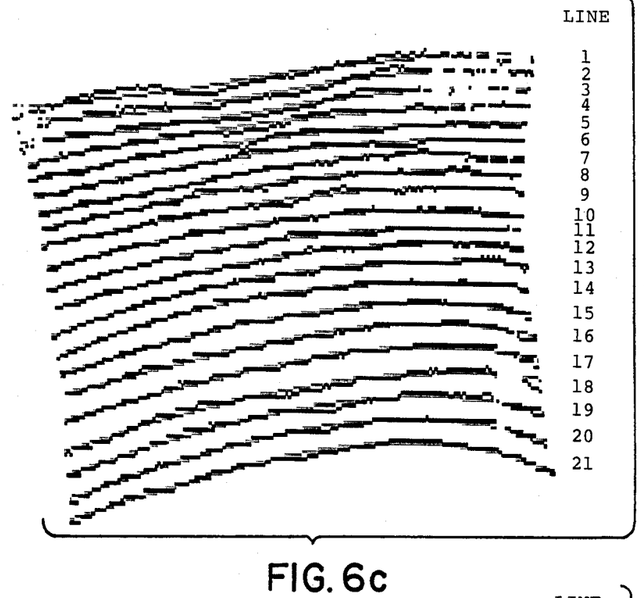

An automobile hood produced from Ashland Phase II sheet molding compound is subjected to the same analysis procedure as described in Example I. Table 3 below sets out the pertinent derived numerical values. The representation of reduced and ideal lines for the SMC automobile hood is provided in FIG. 6c.

TABLE 3

| Line | Corrected Average Line Height (pixels) ("Short-Term") | Root Mean Square Deviation ("Long-Term") |
|---|---|---|
| 1 | 3.6208 | 1.4829 |
| 2 | 3.3929 | 1.2003 |
| 3 | 3.7168 | 0.9671 |
| 4 | 3.7056 | 0.7219 |
| 5 | 3.7102 | 0.5775 |
| 6 | 3.9800 | 0.5541 |
| 7 | 4.2141 | 0.5480 |
| 8 | 4.4248 | 0.5335 |
| 9 | 4.3815 | 0.6399 |
| 10 | 4.3891 | 0.4247 |
| 11 | 4.4954 | 0.4655 |
| 12 | 4.6393 | 0.4468 |
| 13 | 4.7424 | 0.4148 |
| 14 | 5.1388 | 0.4948 |
| 15 | 5.0942 | 0.5181 |
| 16 | 5.1788 | 0.6344 |
| 17 | 5.3481 | 0.6159 |
| 18 | 5.4849 | 1.0722 |
| 19 | 5.4873 | 0.8690 |
| 20 | 5.6463 | 0.6541 |
| 21 | 5.6317 | 0.6298 |
| Overall Average: | 4.5915 | 0.6888 |

Calibration Factor: 1.4925
Corrected RMS Deviation Result: 0.6888 × 1.4925 = 1.0280

OPERATING EXAMPLE IV

Figure 6D:
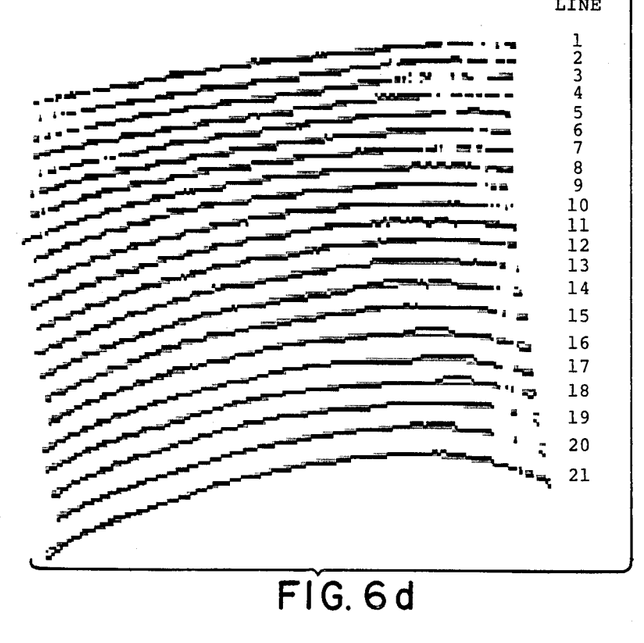

The same shape automobile hood from Example III is formed from Ashland Fast Cure Phase Alpha sheet molding compound. This hood is subjected to the same analysis procedure as described in Example I. Table 4 below sets out the pertinent derived numerical values. FIG. 6d provides the representation of reduced and ideal lines for the fast cure SMC hood.

TABLE 4

| Line | Corrected Average Line Height (pixels) ("Short-Term") | Root Mean Square Deviation ("Long-Term") |
|---|---|---|
| 1 | 2.2243 | 0.3526 |
| 2 | 2.3664 | 0.4858 |
| 3 | 2.2970 | 0.5251 |
| 4 | 2.5250 | 0.3908 |

TABLE 4-continued

| Line | Corrected Average Line Height (pixels) ("Short-Term") | Root Mean Square Deviation ("Long-Term") |
|---|---|---|
| 5 | 2.5832 | 0.3071 |
| 6 | 2.5599 | 0.3915 |
| 7 | 2.5532 | 0.4377 |
| 8 | 2.5574 | 0.3729 |
| 9 | 2.7928 | 0.3702 |
| 10 | 2.8777 | 0.3127 |
| 11 | 2.9156 | 0.3506 |
| 12 | 3.0468 | 0.4287 |
| 13 | 3.2174 | 0.4645 |
| 14 | 3.4644 | 0.6885 |
| 15 | 3.4916 | 0.6416 |
| 16 | 3.6650 | 0.6310 |
| 17 | 3.7313 | 0.5649 |
| 18 | 3.7402 | 0.5819 |
| 19 | 3.8471 | 0.5300 |
| 20 | 3.9957 | 0.5525 |
| 21 | 3.8669 | 0.6653 |
| Overall Average: | 3.0628 | 0.4784 |

Calibration Factor: 1.4925
Corrected RMS Deviation Result: 0.4784 × 1.4925 = 0.7140

The surface of this hood can be seen visually to have less long term waviness than the hood in Example III, as corroborated quantitatively by the lower Corrected RMS Deviation Result for Example IV.

OPERATING EXAMPLES V AND VI

Figure 6E:
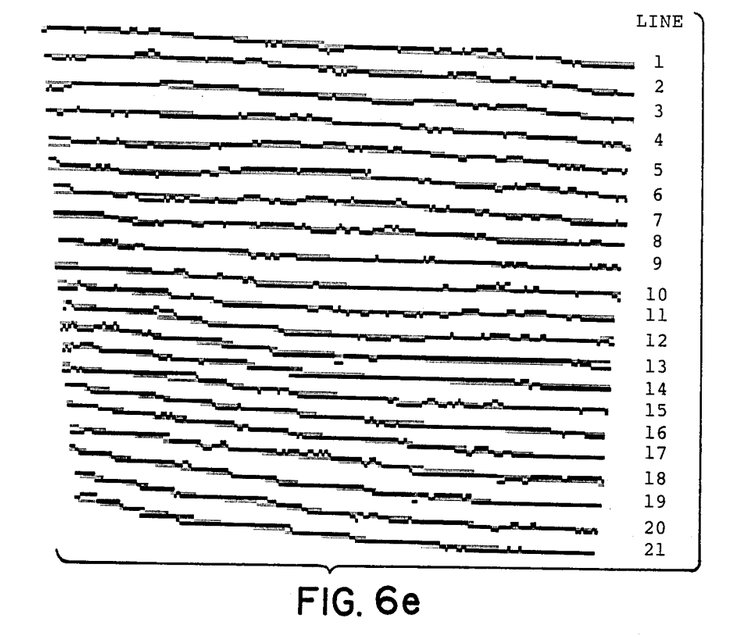

To demonstrate the sensitivity of the non-contact analysis system in differentiating similar parts by long-term waviness defects, two flat plaques produced from sheet molding compound are compared. Example V is a flat SMC plaque with no induced defects. Example VI is a similar flat SMC plaque having a defect induced by removing the plaque from its mold while hot using a suction cup. The line representations of Examples V and VI can be seen in FIGS. 6e and 6f, respectively. Table 5 sets out the RMS deviation and corrected RMS deviation results for each plaque.

TABLE 5

| | Root Mean Square Deviation ("Long-Term") | |
|---|---|---|
| Line | Example V | Example VI |
| 1 | 0.6293 | 1.8545 |
| 2 | 0.7222 | 1.7003 |
| 3 | 0.7455 | 1.3927 |
| 4 | 0.4465 | 1.0953 |
| 5 | 0.5972 | 0.8181 |
| 6 | 0.9872 | 0.9319 |
| 7 | 0.8201 | 0.8480 |
| 8 | 0.6546 | 1.1623 |
| 9 | 0.3505 | 1.3102 |
| 10 | 0.6472 | 1.0299 |
| 11 | 0.6869 | 1.1309 |
| 12 | 0.8518 | 0.9229 |
| 13 | 0.7449 | 0.7930 |
| 14 | 0.6079 | 0.8635 |
| 15 | 0.6245 | 0.7206 |
| 16 | 0.4102 | 0.7675 |
| 17 | 0.4136 | 0.6701 |
| 18 | 0.7409 | 0.4957 |
| 19 | 0.5394 | 0.6233 |
| 20 | 0.4520 | 0.5339 |
| 21 | 0.6919 | 0.6215 |
| Overall Average: | 0.6364 | 0.9660 |

Calibration Factor: 1.1364
Corrected RMS Deviation Result: 0.7232 1.0978

Figure 6F:
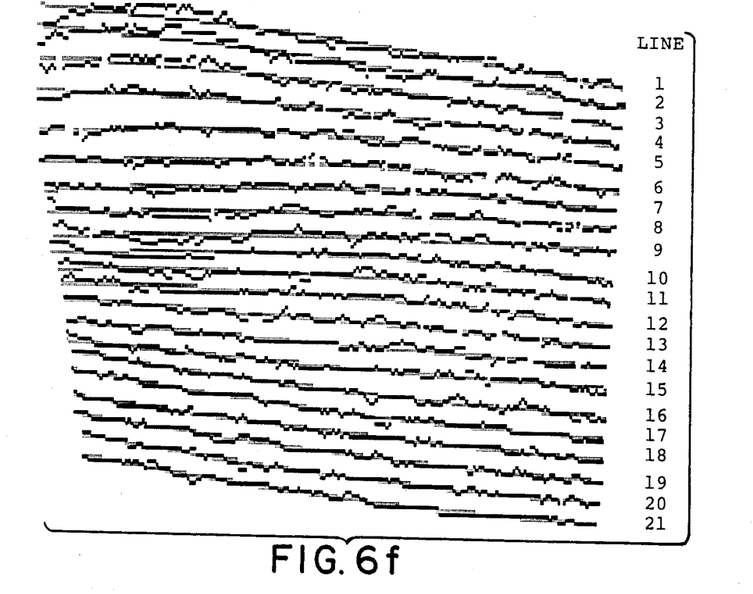

Note the large dissimilarity in RMS Deviation values between Examples V and VI for lines 1 through 4 and lines 8 through 11. FIG. 6f roughly outlines the suction cup mark in the upper left-hand portion of the line representation.

The above mathematical treatment of data points obtained using a reflected image surface evaluation apparatus is intended to demonstrate one means of utilizing the apparatus, not to limit its applicability. The apparatus is useful in quickly and quantitatively evaluating smooth surfaces having a variety of textures. The apparatus is capable of determining both short-term and long-term waviness from a single set of data points. In contrast to surface analysis machines which utilize mechanical sensors to determine changes in contour, the instant invention analyzes a larger area of the surface more quickly and without coming into direct contact with the surface. Further, an apparatus utilizing light radiation employs fewer moving parts than mechanical apparatuses, and is less likely to require repair and recalibration. A light radiation surface evaluation apparatus can be devised to analyze individual surfaces moving along an assembly line. The light radiation apparatus is also inherently portable, and as such can be positioned at any angle relative to the ground plane to evaluate the individual surface. The apparatus therefore can also operate independent of the angle of the individual surface in relation to the ground plane.

The apparatus is able to evaluate a variety of materials and surface textures. For example, the apparatus can be used to evaluate articles such as, but not limited to, SMC panels, films, steel sheets, aluminum foil, cast and extruded plastics, laminates and panels constructed from a variety of materials, paper and paper products, and paint surfaces. The apparatus is also useful in evaluating a variety of surface textures having a range of reflectivities.

The above specification describes the method for evaluating smooth surfaces, operating parameters for utilizing the method, and several uses of the method. Variations may be achieved without departing from the spirit and scope hereof as defined by the claims.

What is claimed is:

1. A method for determining the short term waviness and long term waviness of a reflective surface comprising:
   impinging light radiation onto a portion of the surface at an angle relative to the plane of said surface;
   detecting discrete images created by the reflected light radiation;
   digitizing said images to create data points;
   storing said data points;
   calculating said short term waviness by mathematically processing said data points from each said discrete image to determine the average height of each said discrete image and then calculating the overall average based on a plurality of said average heights; and
   determining said long term waviness by first generating a reduced line for each said reflected image, fitting each said reduced line mathematically to produce an idealized fitted line, calculating the standard deviation of each said reduced line from said corresponding idealized line, and calculating an average standard deviation based on each said standard deviation.

2. The method of claim 1 wherein said light radiation is produced by a laser.

3. The method of claim 2 wherein said light radiation is in the shape of straight line, said line transverse to the direction of propagation of said light radiation at the point of striking said reflective surface.

4. The method of claim 3 wherein said light radiation strikes said surface at an angle in the range of about 30° to about 35°.

5. A method for quantitatively determining the long-term waviness of a reflective smooth surface comprising:
- impinging lines of laser radiation onto the surface to create discrete images which reflect from said surface;
- detecting said reflected images by a video camera;
- digitizing said detected reflected images to create data points;
- storing said data points; and
- determining said long-term waviness by first generating a reduced line for each said reflected image, fitting each said reduced line mathematically to a polynomial which determines an idealized line fit, calculating the standard deviation of each said reduced line from said corresponding idealized line, and calculating an average standard deviation based on each said standard deviation.

6. A method for quantitatively determining the short-term waviness and long-term waviness of a reflective smooth surface comprising:
- impinging lines of laser radiation onto the surface at an angle relative to the plane of said surface to create discrete images which reflect from said surface;
- detecting said reflected images by a video camera;
- digitizing said detected reflected images to create data points;
- storing said data points
- determining said short-term waviness by first calculating the average height of each said reflected image and then calculating the overall average based on each said average height; and
- determining said long-term waviness by first generating a reduced line for each said reflected image, fitting each said reduced line mathematically to a polynomial which determines an idealized line fit, calculating the standard deviation of each said reduced line from said corresponding idealized line, and calculating an average standard deviation based on each said standard deviation.

7. The method of claim 6 wherein said lines of laser radiation impinge said surface at an angle in the range of about 60° to about 5°.

8. The method of claim 6 wherein said lines of laser radiation impinge said surface at an angle in the range of about 35° to about 30°.

9. The method of claim 6 wherein said lines of laser radiation are impinged onto said surface in parallel, equally spaced intervals.

10. A method for quantitatively determining the short term waviness and long term waviness of a reflective smooth surface wherein said short term waviness and said long term waviness are intercomparable with the short term waviness and long term waviness of at least one other reflective smooth surface, comprising:
- impinging lines of laser radiation onto said reflective smooth surface at an angle relative to the plane of said reflective smooth surface to create discrete images which reflect therefrom;
- determining a calibration value relatable to the size of at least one of said reflected images;
- digitizing said detected reflected images to create data points;
- storing said data points on computer storage means;
- determining said short term waviness by first calculating the average height of each said reflected image and then calculating the overall average based on each said average height; and
- determining said long term waviness by first generating a reduced line for each said reflected image, ffitting each said reduced line mathematically to a polynomial which determines an idealized line fit, calculating the standard deviation of each said reduced line from said corresponding idealized line, and calculating an average standard deviation based on each said standard deviation.

* * * * *